(12) United States Patent
Hamelmann et al.

(10) Patent No.: US 12,551,603 B2
(45) Date of Patent: Feb. 17, 2026

(54) SENSOR ARRANGEMENT FOR A BREAST PUMP DEVICE AND BREAST PUMP DEVICE USING THE SENSOR ARRANGEMENT

(71) Applicant: KONINKLIJKE PHILIPS N.V., Eindhoven (NL)

(72) Inventors: Paul Christoph Hamelmann, Aachen (DE); Michiel De Jong, Bergerac (FR); Yannyk Parulian Julian Bourquin, Eindhoven (NL); Adrianus Wilhelmus Dionisius Maria Van Den Bijgaart, Helvoirt (NL); Babu Varghese, Eindhoven (NL); Cornelis Bernardus Aloysius Wouters, Echt (NL); Antonius Hermanus Maria Blom, Escharen (NL); Rene Dick Kragt, Gemonde (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 542 days.

(21) Appl. No.: 18/019,929

(22) PCT Filed: Aug. 11, 2021

(86) PCT No.: PCT/EP2021/072324
§ 371 (c)(1),
(2) Date: Feb. 6, 2023

(87) PCT Pub. No.: WO2022/038006
PCT Pub. Date: Feb. 24, 2022

(65) Prior Publication Data
US 2023/0285646 A1   Sep. 14, 2023

(30) Foreign Application Priority Data

Aug. 18, 2020 (EP) .................................. 20191455

(51) Int. Cl.
*A61M 1/06* (2006.01)

(52) U.S. Cl.
CPC ............ *A61M 1/0693* (2021.05); *A61M 1/06* (2013.01); *A61M 1/062* (2014.02);
(Continued)

(58) Field of Classification Search
CPC ...... A61M 1/0693; A61M 1/062; A61M 1/06; A61M 2205/3306; A61M 2205/3379; A61M 2205/50
See application file for complete search history.

(56) References Cited

U.S. PATENT DOCUMENTS

| 10,483,002 B2 | 11/2019 | Guthrie et al. |
| 2005/0059928 A1 | 3/2005 | Larsson |

(Continued)

FOREIGN PATENT DOCUMENTS

| EP | 3533479 A1 | 9/2019 |
| WO | 2013093739 A1 | 6/2013 |

(Continued)

OTHER PUBLICATIONS

International Search report and Written Opinion of PCT/EP2021/072324, dated Nov. 30, 2021.

*Primary Examiner* — Tasnim Mehjabin Ahmed

(57) ABSTRACT

A sensor system is for sensing the start of milk expression into a collection vessel when using a breast pump device. An optical sensor is used to provide a signal indicating the presence of the first milk expressed, for use in controlling the breast pump to switch from a stimulation mode to an expression mode.

8 Claims, 8 Drawing Sheets

(52) U.S. Cl.
CPC ............ *A61M 2205/3306* (2013.01); *A61M 2205/3379* (2013.01); *A61M 2205/50* (2013.01)

(56) References Cited

U.S. PATENT DOCUMENTS

| | | | |
|---|---|---|---|
| 2016/0220743 A1* | 8/2016 | Guthrie | ................ G06F 3/0482 |
| 2016/0228626 A1 | 8/2016 | Cassano | |
| 2019/0209747 A1 | 7/2019 | Analytis et al. | |
| 2019/0328945 A1 | 10/2019 | Analytis et al. | |
| 2020/0078503 A1* | 3/2020 | Bartlett | ................ A61M 1/062 |

FOREIGN PATENT DOCUMENTS

| | | |
|---|---|---|
| WO | 2018054758 A1 | 3/2018 |
| WO | 2019149486 A1 | 8/2019 |

* cited by examiner

SENSOR ARRANGEMENT FOR A BREAST PUMP DEVICE AND BREAST PUMP DEVICE USING THE SENSOR ARRANGEMENT

CROSS-REFERENCE TO PRIOR APPLICATIONS

This application is the U.S. National Phase application under 35 U.S.C. § 371 of International Application No. PCT/EP2021/072324, filed on Aug. 11, 2021, which claims the benefit of European Patent Application No. 20191455.3, filed on Aug. 18, 2020. These applications are hereby incorporated by reference herein.

FIELD OF THE INVENTION

The invention relates to a breast pump device and a method of operating a breast pump device, and in particular relates to a sensor arrangement for use as part of the breast pump device.

BACKGROUND OF THE INVENTION

Breast pumps are used by breast feeding women to extract milk from their breast such that the extracted milk can be fed to their babies at a later time.

It is well known that best nutrition for babies is breast milk. The world health organization (WHO) recommends to breast feed babies for at least one year, preferably longer. However, mothers often go back to work after only several weeks or months. To provide the best nutrition to their babies, mothers may then express milk using a breast pump. The expressed milk can be stored and given to the baby at a later stage and/or by somebody else.

Typically, the breast is placed into a funnel shaped cup and a vacuum is applied such that milk is extracted. Breast pumps typically have a stimulation mode to activate the milk ejection reflex (MER), and an expression mode.

However, at the moment, the transition from the stimulation mode to the expression mode is not based on detection of MER, it is either time-based, i.e. a fixed time after switching on, or manual by pushing a button. Both these methods have drawbacks. The timing method is based on an average time, so late for a lot of women and too early for others. The manual method has the drawback that not every woman feels that the milk is flowing and they have to check the bottle. Therefore, detection when milk starts flowing into the bottle would allow for a personalized solution for automatic switching between the stimulation mode and the expression mode.

It would be desirable to be able to detect the first drop or drops, to enable automatic switching between a stimulation mode and an expression mode.

WO 2019/149486 discloses a breast pump which includes a sensor arrangement for detecting a volume of expressed milk. The sensor arrangement is used to measure a free fall time of milk droplets, and thereby determine a liquid level of the milk collection vessel into which the milk droplets are falling. It is also recognized that the start of the milk let-down reflex can be detected based on a sudden increase in volume of collected milk. The pump settings of the breast pump may then be adjusted.

However, this approach requires a volume of milk to be collected before detection is possible of a change in the rate at which the volume increases. Thus, it is not suitable for detecting the first drop or drops of expressed milk.

There is therefore a need for an improved sensor arrangement for early detection of the initial milk expression.

US 2020/078503 discloses a breast pump with sensors that produce data regarding an amount of milk expressed, and this data may be used to adjust pumping parameters.

US 2016/220743 discloses a breast pump in which an optical emitter and detector are used to sense milk drops, and thereby determine a flow rate.

US 2019/209747 discloses a milk flow rate sensor for a breast pump for sensing a flow rate and an amount of milk expressed.

SUMMARY OF THE INVENTION

The invention is defined by the claims.

According to examples in accordance with the invention, there is provided a sensor system for sensing the start of milk expression into a collection vessel when using a breast pump device, comprising:
 an optical emitter arrangement;
 an optical detector arrangement; and
 an output for providing a signal indicating the presence of the first milk expressed for use in controlling the breast pump to switch from a stimulation mode to an expression mode,
 wherein an optical path between the optical emitter arrangement and the optical detector arrangement is changed by the presence of milk.

The optical path can for example be enhanced by the presence of the first milk expressed, or be diminished by the presence of the first milk expressed. Alternatively, a phase change rather than an amplitude change may be implemented.

This sensor system is used to detect the first expressed milk, so that a breast pump device may switch from a stimulation mode to an expression mode. The sensor system uses optical sensing, such that the presence of milk creates a different optical path between an emitter and a detector. For example, the optical path may include air or milk, depending on whether milk has started to be expressed. The milk may diminish e.g. interrupt the path (by creating additional scattering compared to air in the direct path) or it may enhance e.g. complete the path (by creating a light pathway using reflection or scattering by the milk that was not created by air).

The use of optical sensing in this way enables a low cost and simple sensing solution, to allow automatic switching of a breast pump device from a stimulation mode to an expression mode.

In a first set of examples, the sensor system further comprises a blocking arrangement between the optical emitter arrangement and the optical detector arrangement for blocking a direct light path between them. Thus, the light path may only exist based on scattering or reflection, and this will depend on the medium present, e.g. air or milk.

The optical emitter arrangement and the optical detector arrangement are for example configured for location at the base of the collection vessel such that when the collection vessel is empty, radiation from the optical emitter arrangement reaching the optical detector arrangement is below a threshold. When the collection vessel contains liquid, scattering or reflection of the radiation from the optical emitter arrangement by the liquid results in the radiation from the optical emitter arrangement reaching the optical detector exceeding the threshold.

In this design, the sensor arrangement is for detecting the first drops of milk which collect at the bottom of the collection vessel. When there is no liquid, the blocking arrangement prevents a direct path of radiation to the detector, and the air in the collection vessel provides limited scattering so that the detector receives radiation below the threshold. When milk is present, a path exists by means of scattering and/or reflection by the milk so that the radiation received by the detector is above the threshold. Thus, the threshold enables milk or air to be distinguished at the bottom of the collection vessel.

The sensor system may comprise a sensor ring such that liquid anywhere in the vicinity of the ring results in the radiation from the optical emitter arrangement reaching the optical detector arrangement at levels above the threshold.

The ring design means that the first liquid droplets can be detected regardless of the orientation of the collection vessel.

The sensor ring may comprise an alternating sequence of optical emitters and optical detectors around the ring. Thus, there is sensing at a series of regions around the ring so that liquid at any region will enable a detection to be made.

The blocking arrangement may then comprise a blocking element between each adjacent optical emitter and optical detector. Thus, a collected droplet spans the area over the blocking element to enable an optical path to be formed between the emitter and detector through the milk droplet.

The sensor ring may instead comprise an optical emitter, a first ring shaped lightguide for directing the radiation from the optical emitter, an optical detector, and a second ring shaped lightguide for guiding radiation to the optical detector, wherein the blocking arrangement comprises a blocking element between the first and second lightguides.

Thus, when a liquid droplet is in contact with the two lightguides, there can be coupling of radiation between them, so that the detector then receives radiation from the emitter to exceed the threshold. This enables a single sensor and a single detector to implement a sensor ring.

The sensor system of this set of examples may be integrated into a holder for a base of the collection vessel. Thus, it may be an accessory to a breast pump system which is used as a bottle holder.

The invention also provides a collection vessel system for use with a breast pump, comprising:
  a collection vessel for collecting milk expressed during use of the breast pump; and
  the sensor system defined above for sensing milk in the collection vessel.

The collection vessel for example comprises a base with an annular seat portion and a raised central portion, wherein the sensor system is for sensing milk collected at any location around the annular seat portion. This seat portion may have a small area so that a small amount of liquid can be sensed.

In a second set of examples, the sensor system is configured for detecting expressed milk droplets in a neck portion of an expression kit where the breast pump connects to the collection vessel, or a neck portion of the collection vessel.

Expressed milk passes this neck portion before it reaches the bottom of the collection vessel. Droplets can thereby be sensed as they pass the neck portion.

The sensor system may be a clip-on fitting around the neck portion. Thus, it may again be an accessory to a breast pump system.

In this set of examples, the optical emitter arrangement may comprise a set of one or more emitters and the optical detector arrangement may comprise a set of one or more detectors, each set arranged around the neck portion. When there are multiple emitters, they may be actuated in sequence or at the same time. The pattern of received signals at the detector or detectors then enables determination of when a milk droplet has passed.

The invention also provides a breast pump device, comprising
  at least one breast receiving portion configured to receive a breast of a user;
  a pressure source coupled to the at least one breast receiving portion and being configured to generate at least an under-pressure;
  a controller configured to control an operation of the pressure source in a stimulation mode and in an expression mode; and
  the sensor system defined above, wherein the controller is configured to switch from the stimulation mode to the expression mode in response to a signal from the sensor system.

This breast pump device enables automatic switching from a stimulation mode to an expression mode, so making the operation of the system easier for the user.

The invention also provides a method of controlling a breast pump device, comprising:
  sensing the start of milk expression into a collection vessel when using the breast pump device by sensing when an optical path is made between an optical emitter arrangement and an optical detector arrangement by the presence of the first milk expressed, or an optical path is broken between an optical emitter arrangement and an optical detector arrangement by the presence of the first milk expressed; and
  controlling the breast pump device to switch from a stimulation mode to an expression mode in response to the detection of the sensed start of milk expression.

The method may be implemented in software, and the invention thereby provides a computer program comprising computer program code which is adapted, when said program is run on a computer, to implement the method.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
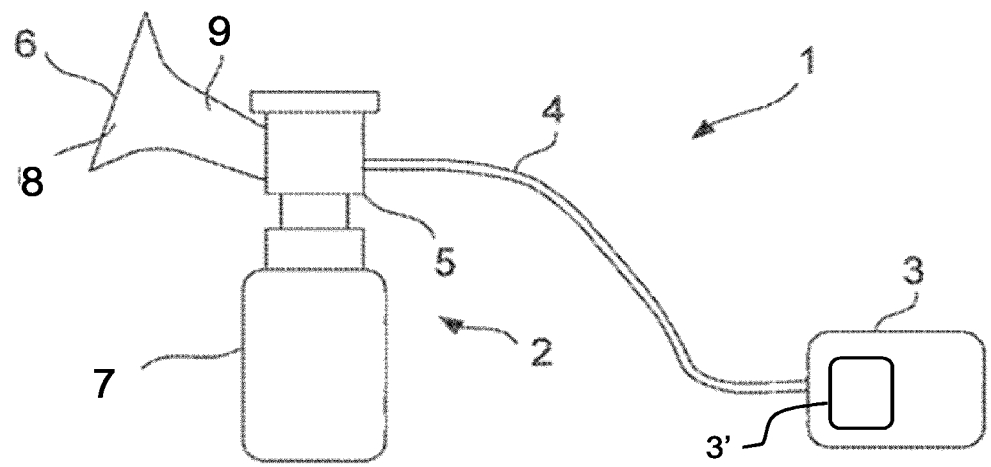
FIG. 1 shows the typical parts of a known breast pump system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a sensor system for sensing the start of milk expression into a collection vessel when using a breast pump device. An optical sensor is used to provide a signal indicating the presence of the first milk expressed, for use in controlling the breast pump to switch from a stimulation mode to an expression mode.

FIG. 1 shows the typical parts of a known breast pump system. The breast pump system 1 comprises a breast pump 2, also known as an expression unit, and an operating unit 3. The operating unit is basically a vacuum pump, associated hardware, and a pump controller 3'.

The breast pump 2 and the operating unit 3 are connected by a hose 4. The hose 4 provides a fluid communication between the breast pump 2 and the operating unit 3. The hose 4 may also be used to provide an electrical connection between the breast pump 2 and the operating unit 3. For example, the hose 4 may supply an operating signal or electrical power between the breast pump and the operating unit. In an alternative embodiment, the operating unit 3 is directly mounted and connected to the breast pump 2.

The breast pump 2 has a main body 5, a funnel 6 and a collection vessel 7. The collection vessel 7 collects milk expressed from a user's breast and may take the form of a feeding bottle or bag or any suitable container. The collection vessel 7 is attached to the main body 5 by a screw fitting, although it will be understood that alternative releasable attachment means may be used, such as clips (not shown).

The breast-receiving funnel 6 extends from the main body 5. The funnel 6 is configured to receive the breast of a user. The funnel 6 has a mouth 8 and a throat 9. The mouth 8 is open at an outer end of the funnel 6 to receive a user's breast, and the funnel 6 converges from the outer end towards the throat 9 to form a hollow recess in which a breast is received.

The main body 5 fluidly connects the funnel 6 to the collection vessel 7. A fluid passageway 10 (refer to FIG. 2) is formed through the main body 5 from the breast receiving space of the funnel 6 to the collection vessel 7. The main body 5 is formed from an outer shell. The main body 5 is integrally formed with the funnel 6, however it will be understood that the funnel 6 may be detachable. In the present arrangement, the main body 5 is formed from polypropylene, although it will be understood that alternative suitable materials may be used.

Figure 2:
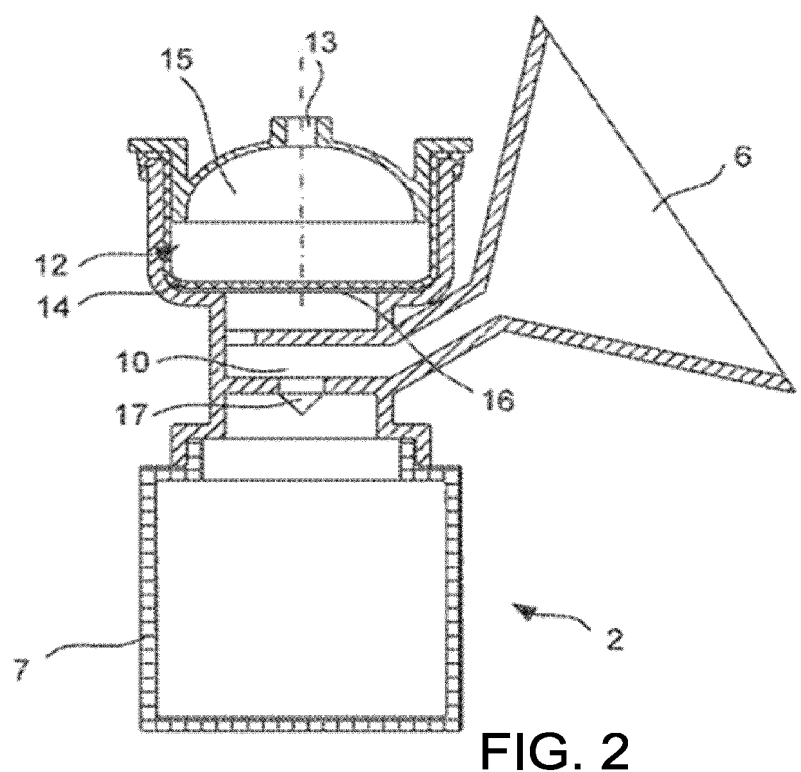
FIG. 2 shows one example of breast pump design in more detail.

Referring now to FIG. 2, a chamber 12 is formed in the main body 5. The chamber forms part of a vacuum path. The chamber 12 is in fluid communication with the fluid passageway 10 between the funnel 6 and the collection vessel 7. The chamber 12 has a vacuum port 13. The vacuum port 13 provides a port to communicate with the operating unit 3. The hose 4 is mountable to the vacuum port 13 to fluidly connect the chamber 12 with the operating unit 3.

A membrane 14 is received in the chamber 12. The membrane 14, also known as a diaphragm, is flexible. An outer rim of the membrane 14 is mounted to the chamber 12. The membrane 14 separates the chamber 12 into a first space 15 and a second space 16. The first space 15 communicates with the vacuum port 13. The first space 15 forms part of a first section of the vacuum path. The second space 16 communicates with the fluid passageway 10 between the breast receiving space of the funnel 6 and the collection vessel 7. The second space 16 forms part of a first section of the vacuum path.

A one-way valve 17 is disposed in the fluid passageway 10. The one-way valve 17 prevents a pressure reduction being formed in the collection vessel 7. The one-way valve is for example a duckbill valve.

The membrane 14 is for example formed from silicone. However, it will be understood that the membrane 14 may be formed from another suitable material.

The flexible membrane 14 has a predefined shape. In the present arrangement, the membrane 14 has a substantially cup-shaped arrangement in a neutral condition. That is, when the membrane 14 is received in the chamber 12, but has not been deformed. However, it will be understood that the membrane 14 may have an alternative shape.

The operating unit 3 comprises a pump controller 3', a power source, a motor and a pump unit actuated by the motor. The pump unit is configured to generate and release a pressure reduction (i.e. vacuum) in the vacuum path, for example using a pressure relief valve separate to the pump unit, although these may be combined into a single unit. The controller 3' controls operation of these components of the operating unit 3.

The controller 3' operates the pump unit with sequence of strokes, each stroke comprising the vacuum generation phase and the vacuum release phase. During vacuum generation, the breast is stimulated to express milk. This milk flows to the fluid passageway 10. During the vacuum release phase, the milk passes through the one-way valve 17 into the collection vessel. A small opening is for example provided to allow air to escape from the bottle. This may be located at the screw connection.

Figure 3:
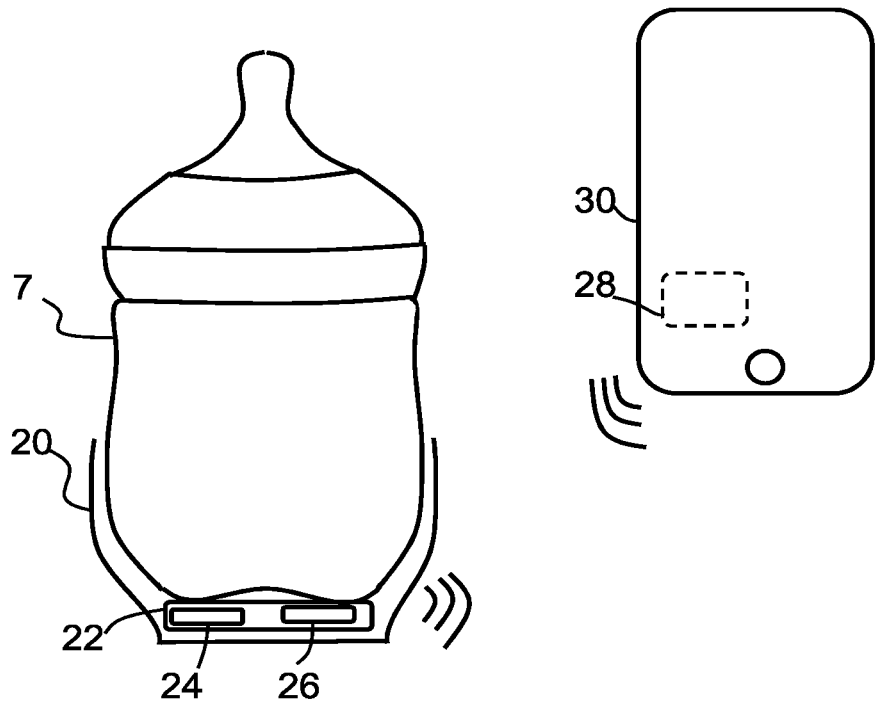
FIG. 3 shows a known feeding bottle mounted in a sleeve which functions as a monitoring system.

It is known to provide a sleeve for monitoring the movements of a bottle during feeding. FIG. 3 shows a known feeding bottle 7 mounted in a sleeve 20 which functions as a monitoring system. The sleeve 20 surrounds the base of the feeding bottle 7. For example, it is known to provide a monitoring unit 22 in the base of the sleeve 20, comprising a motion sensor 24, and an output interface 26. The monitoring unit 22 may be incorporated anywhere in or on the sleeve. A processor 28 may then be used to process the monitoring unit data, for example to monitor feeding performance of the feeding baby based on the sensed motion. As shown, this processor may be the processor of a mobile phone 30 on which a suitable app is loaded.

The invention provides a sensor system for sensing the start of milk expression into a collection vessel when using a breast pump device. An optical sensor is used to provide a signal indicating the presence of the first milk expressed, for use in controlling the breast pump to switch from a stimulation mode to an expression mode.

Figure 4:
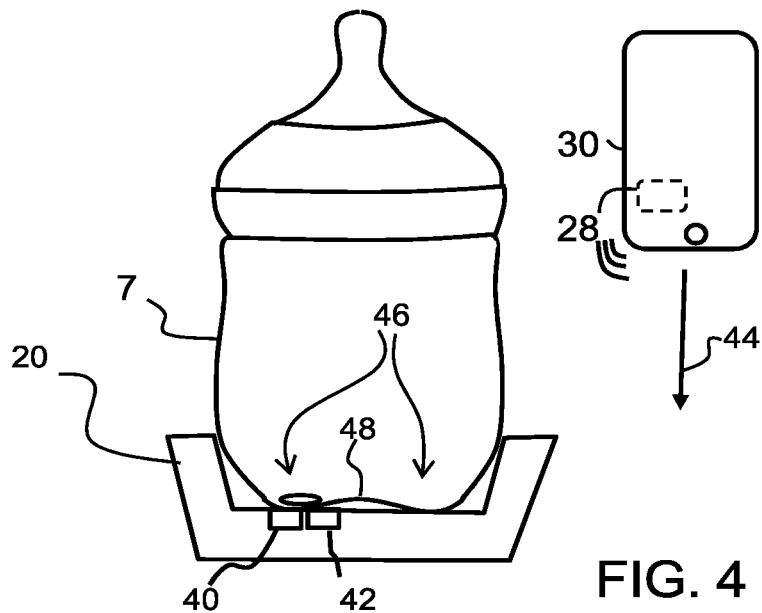
FIG. 4 shows schematically one example of an implementation of the invention.

FIG. 4 shows schematically one example of an implementation of the invention, in which an optical sensor is incorporated into the sleeve 20, at the bottom of the collection vessel, so that the invention is implemented in similar manner to the system shown in FIG. 3.

The optical sensor comprises an optical emitter arrangement 40 and an optical detector arrangement 42. An eventual output 44 from the sensor system is a signal indicating the presence of the first milk expressed for use in controlling the breast pump to switch from a stimulation mode to an expression mode.

There is an optical path between the optical emitter arrangement 40 and the optical detector arrangement 42. In this example, the path is enhanced by the presence of the first milk expressed. The milk enhances e.g. completes the path, by creating a light pathway using reflection or scattering by the milk. This light pathway is less effective in air.

In other examples, as described below, the optical path may be diminished by the presence of the first milk expressed by creating additional scattering or reflection compared to air in the direct path. Thus, the optical sensing function depends on the way in which the optical sensor is implemented. The optical path will pass through either air or milk, giving different sensor responses.

The sensor system is used to detect the first expressed milk, so that a breast pump device may switch from a stimulation mode to an expression mode.

As shown in FIG. 4, the base of the collection vessel has an annular seat portion 46 (which defines the surface which supports the collection vessel when resting on a surface) and a raised central portion 48, wherein the sensor system is for sensing milk collected at any location around the annular seat portion 46.

This seat portion 46 may have a small area so that a small amount of liquid will flow to a known position within the collection vessel, i.e. somewhere around the seat portion, depending on the angular orientation of the collection vessel.

In the example of FIG. 4, the optical emitter arrangement 40 and the optical detector arrangement 42 are at the base of the collection vessel such that when the collection vessel is empty, radiation from the optical emitter arrangement reaching the optical detector arrangement is below a threshold. When the collection vessel contains liquid (i.e. milk), scattering or reflection of the radiation from the optical emitter arrangement by the liquid results in the radiation from the optical emitter arrangement reaching the optical detector exceeding the threshold.

Figure 5:
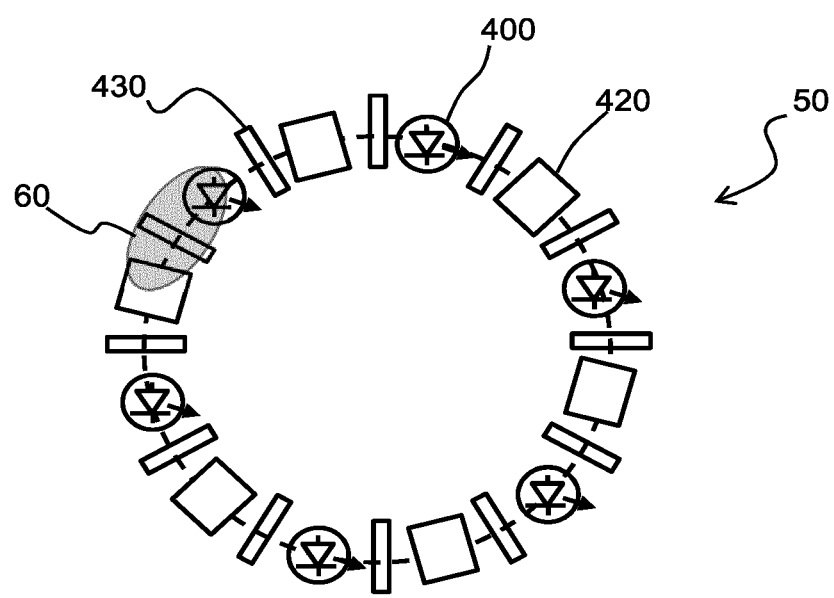
FIG. 5 shows an example of an implementation of the optical sensor at the base of the collection vessel.

FIG. 5 shows an example of an implementation of the optical sensor at the base of the collection vessel, which makes use of sensing at this seat portion 46.

The sensor system comprises a sensor ring 50 such that liquid anywhere in the vicinity of the ring results in the radiation from the optical emitter arrangement 40 which reaches the optical detector arrangement 42 exceeding the threshold. The ring design means that the first liquid can be detected regardless of the orientation of the collection vessel. The ring for example has a diameter of 50 mm.

The sensor ring 50 comprises an alternating sequence of optical emitters 400 and optical detectors 420 around the ring. Thus, there is sensing at a series of regions around the ring so that liquid at any region will enable a detection to be made.

When a drop (or drops) has flowed to the bottom of the collection vessel, as represented by droplet 60, it will be detected either by a single detector, or by multiple detectors, making the detection quality independent of the position of the droplet in the seat portion of the bottom of the collection vessel.

The distance between the emitters 400 and detectors 420, and hence the number of sensor pairs, determines the sensitivity to the first drops. If the distance is too large, light will not be able to be scattered back onto the detector.

A blocking arrangement is also provided which comprises blocking elements 430 between each adjacent optical emitter 400 and optical detector 420.

Figure 6:
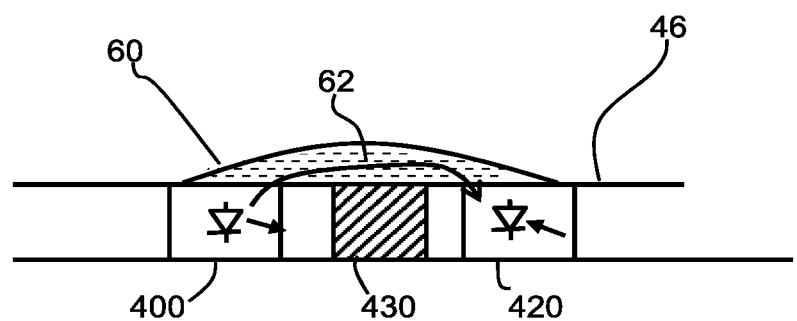
FIG. 6 shows a side view along a portion of the sensor ring of FIG. 5.

FIG. 6 shows a side view around a portion of the ring. It shows a droplet 60 which spans the area over a blocking element 430 to enable an optical path 62 to be formed between the emitter 400 and detector 420 by scattering or reflection.

Figure 7:
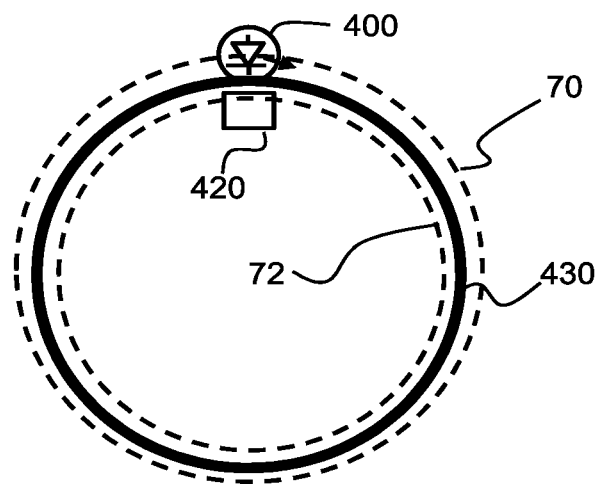
FIG. 7 shows an alternative sensor ring design.

FIG. 7 shows an alternative sensor ring design, having only one optical emitter 400, a first ring shaped lightguide 70 for directing the radiation from the optical emitter, an optical detector 420, and a second ring shaped lightguide 72 for guiding radiation to the optical detector. Optionally, a blocking arrangement comprises a blocking element 430 between the first and second lightguides 70, 72 to prevent direct light coupling between them. However, this direct path may in any case be blocked by the total internal reflections within the lightguides.

When a liquid droplet is in contact with the two lightguides, the total internal reflection may be interrupted, and there can be coupling of radiation between them, so that the detector 420 then receives radiation from the emitter at a level which exceeds the threshold. This enables a single sensor and a single detector to implement a sensor ring.

Alternatively, a single light guide may be used to transmit light and a ring of detectors may be used to receive the scattered light.

Figure 8:
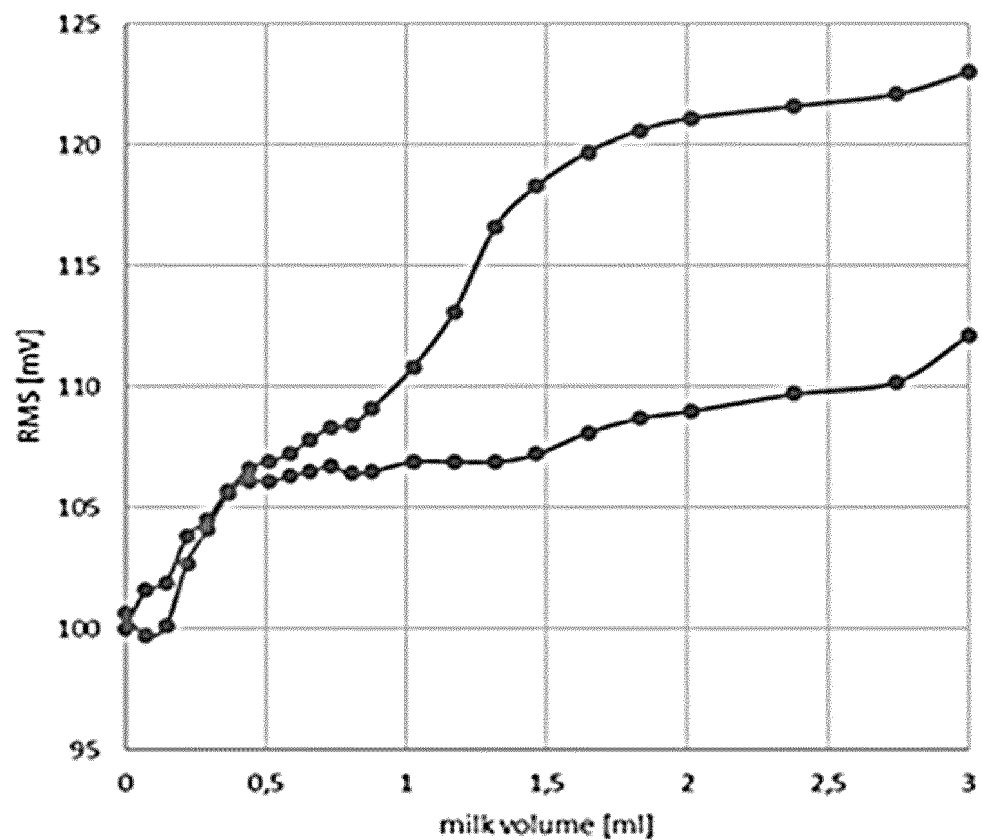
FIG. 8 shows the result of an experiment in which milk drops were successively added on top of the sensor design of FIG. 5.

FIG. 8 shows the result of an experiment in which milk drops were successively added on top of the sensor design of FIG. 5. It shows the output from two sensors around the sensor ring as a voltage (y-axis) for different added milk volumes (x-axis). Even only a few milk drops are detected by the both sensors, showing the feasibility of detecting the first expressed droplets.

In a second set of examples, the sensor system is configured for detecting expressed milk droplets in a neck portion of an expression kit where the breast pump connects to the collection vessel or a neck portion of the collection vessel.

Figure 9:
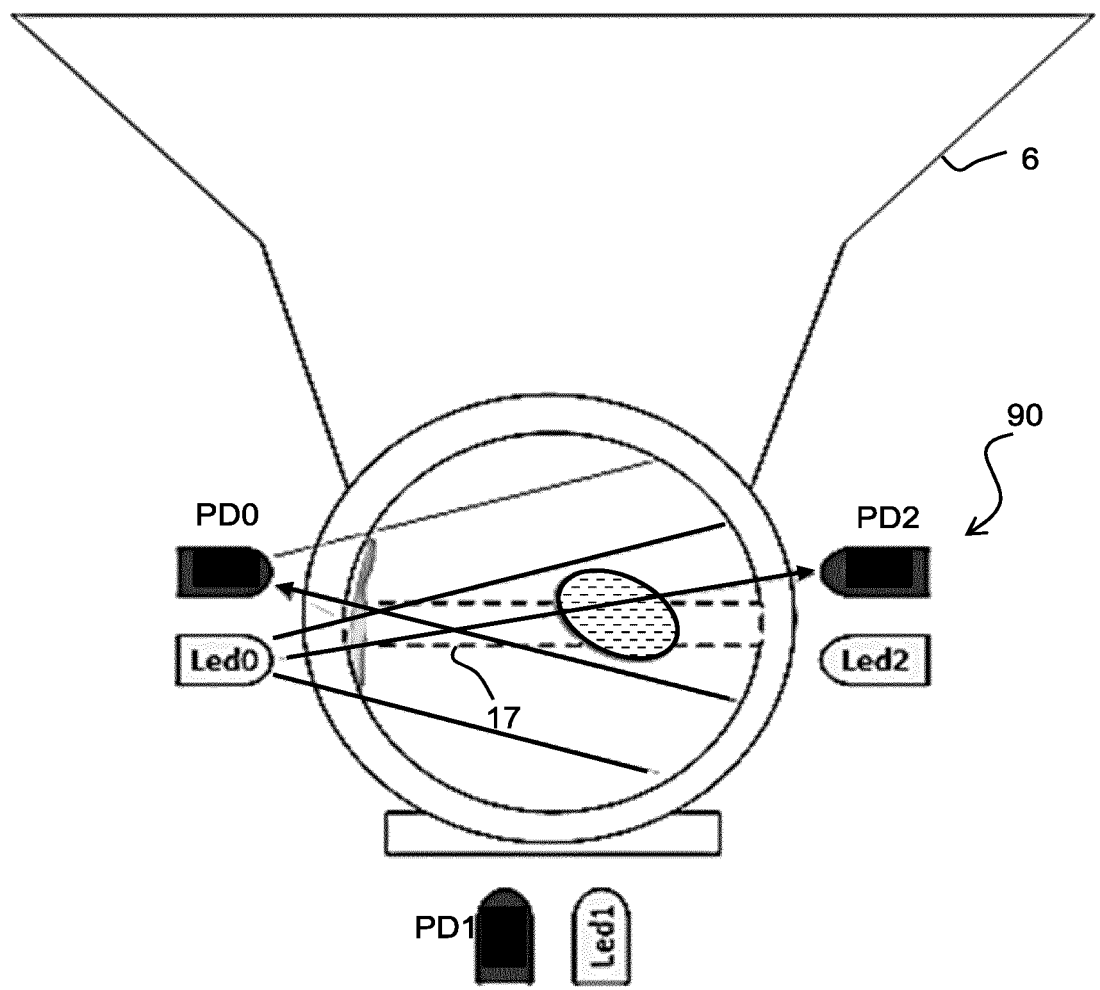
FIG. 9 shows an example in which the optical sensor system is located at the neck portion of the expression kit.

FIG. 9 shows an example in which the optical sensor system is located at the neck portion of the expression kit. It shows a cross section through the fluid passageway 10 looking from above. It shows the valve 17 and a milk droplet 60 at the valve. Expressed milk passes this neck portion before it reaches the bottom of the collection vessel. Droplets can thereby be sensed as they pass the neck portion.

The detection may be based on detecting the interruption of a light beam, or it may be based on measurement of a change in reflection or scattering of light back from a layer of milk on the inner wall of the expression kit.

In this example the optical sensor may comprise a snap-on holder, which can snap onto the neck portion of the expression kit.

The emitter or emitters and detector or detectors may be mounted externally of the expression kit. The design may make use of the diffuse properties of the material used for making the expression kit, such as silicone. As emitter, a LED having a large divergence angle (approximately 120 degrees) may be used as the illumination source and the light that exits internally after passage through the material exhibits a near diffuse illumination pattern illuminating the whole head of the bottle. This enables to detect any small changes in the intensity on a detector due to the changes in the absorption and scattering induced by the flowing milk. Thus, it may suffice to have a single emitter and a single detector.

The example of FIG. 9 instead comprises three emitters (LEDs) LED0, LED1, LED2 and three detectors (photodiodes) PD0, PD1, PD2. The signals obtained from the detectors are processed to determine the presence of a milk drop based on changes in the intensity of light detected in all detectors.

Figure 10:
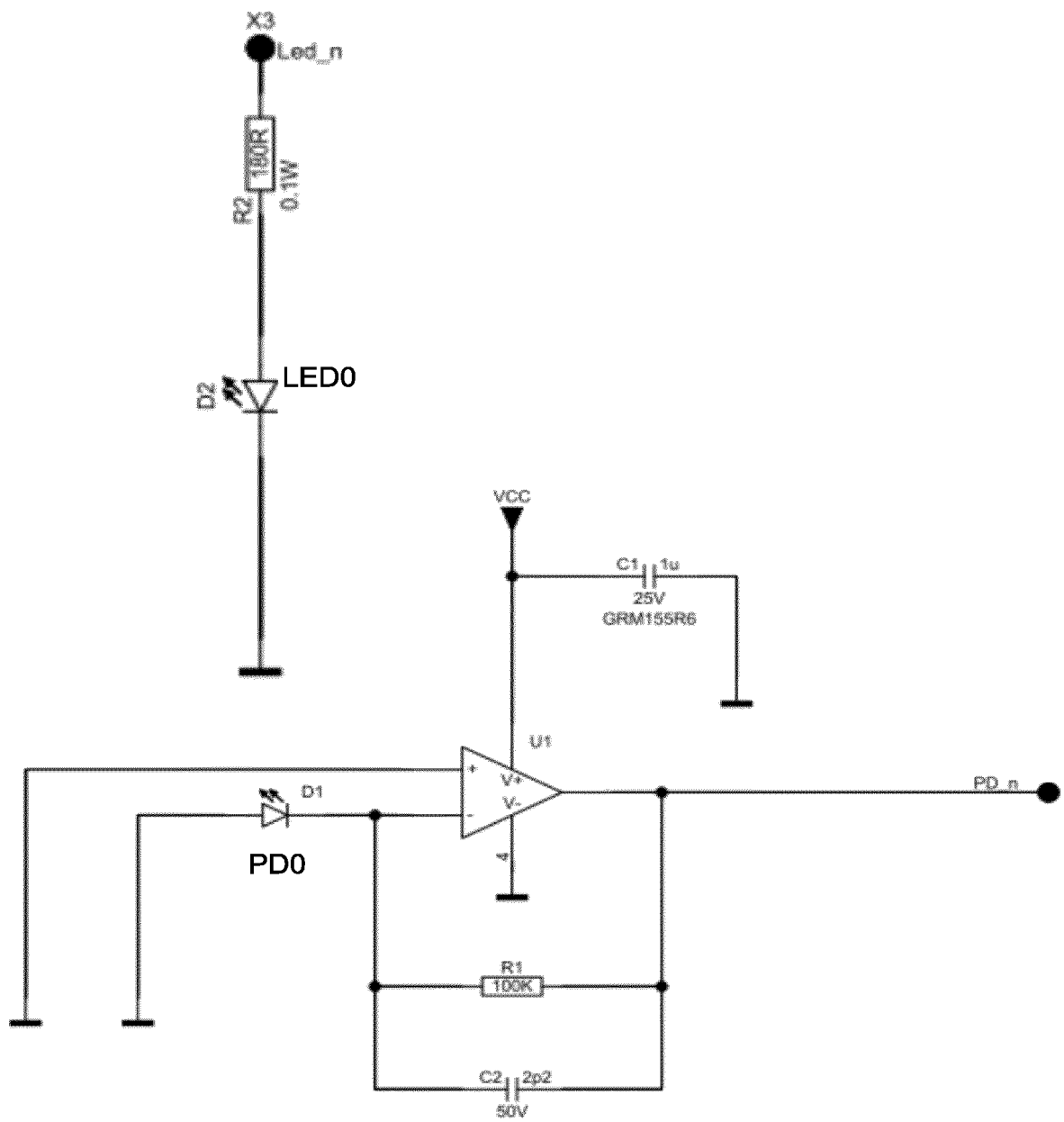
FIG. 10 shows the drive circuits for the emitter and detectors.

FIG. 10 shows that the emitter LED0 (for example) is simply driven by a voltage source and a current limiting resistor R2.

The detector PD0 (for example) is coupled to a transimpedance amplifier U1 with high gain to convert the photo current into a voltage that can be read out by a microprocessor.

Figure 11:
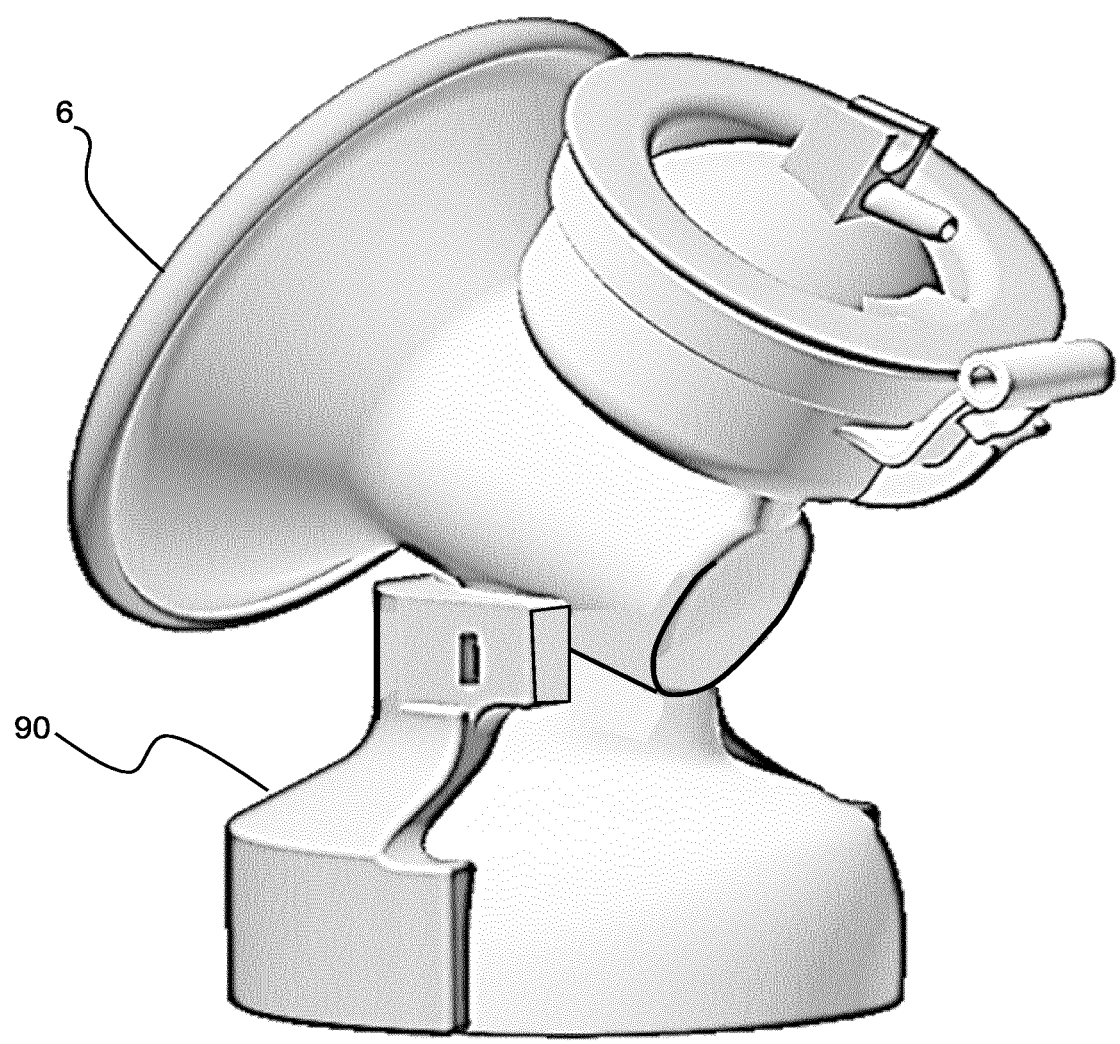
FIG. 11 shows the expression kit having the sensor arrangement designed as a snap-on feature for fitting around the neck of the expression kit.

FIG. 11 shows the expression kit having the sensor arrangement 90 designed as a snap-on feature for fitting around the neck of the expression kit. It could instead fit around the top of the collection vessel.

The light output from each emitter may be monitored by all detectors, so that reflections as well as direct light coupling is monitored. In a system with three emitters and three detectors, as shown, a read out protocol may for example comprise the steps of:

Switch on LED0, read out the three photodetector signals PD0,PD1,PD2.

Switch on LED1, read out the three photodetector signals PD0,PD1,PD2.

Switch on LED2, read out the three photodetector signals PD0,PD1,PD2.

The sequence is performed at a sufficient rate to detect falling drops, interrupting the light beams as the drops fall. For example the cycle may be performed at a rate of tens to hundreds of Hz.

Figure 12:
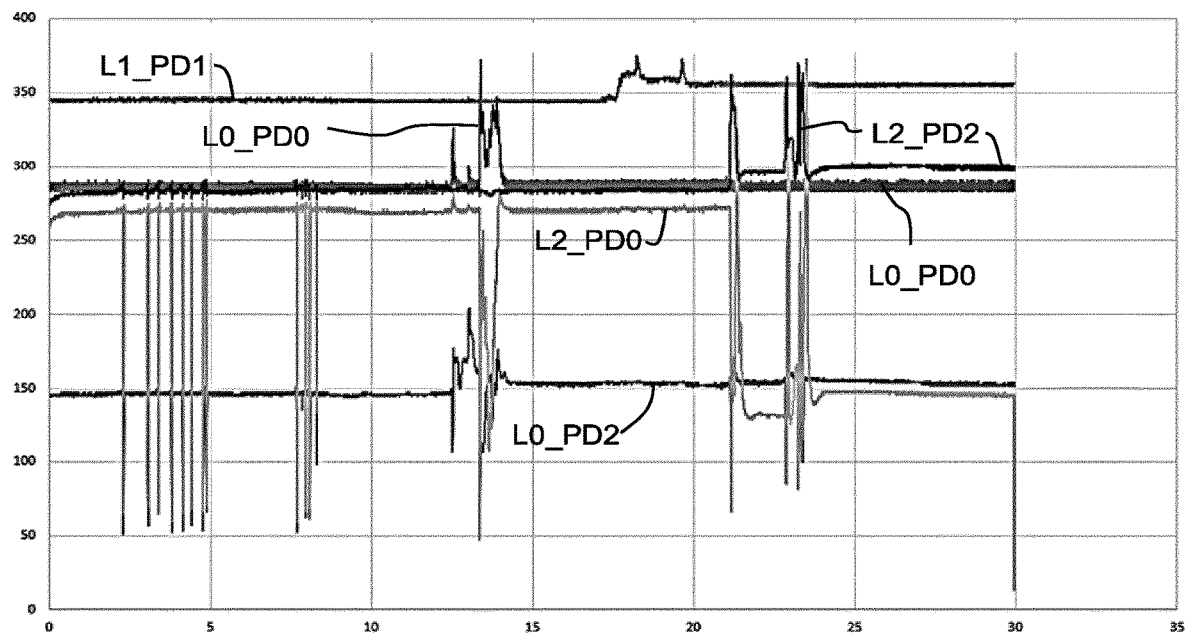
FIG. 12 shows example traces for the sensor system of FIG. 9.

FIG. 12 shows four example traces. Lx_PDy is for emission by emitter LEDx and detection by detector PDy. By way of example, traces are shown for L0_PD0, L0_PD2, L1_PD1, L2_PD0 and L2_PD2. Lx_PDx (i.e. emitter and detector at the same location) provide reflection monitoring signals, whereas the other signal provide transmission monitoring signals.

At time 0 to 10, formula milk is dripped into the center of the neck.

At time 10 to 15, formula milk is dripped near PD0.
At time 15 to 20, formula milk is dripped near PD1.
At time 20 to 25, formula milk is dripped near PD2.

The interruptions to light transmission can clearly be seen in particular for opposing emitter and detector pairs, such as L0_PD2 and L2_PD0.

The signal disturbances in L0_PD0 and L2_PD2 relate to reflection due to milk flowing against the walls next to the sensor location.

The reflected signal from the film of milk passing the optical sensors could also be used to derive information relating to the amount of milk expressed. Adding up the surface area under each pulse in these signals may be used to give an indication of the total amount of milk.

Figure 13:
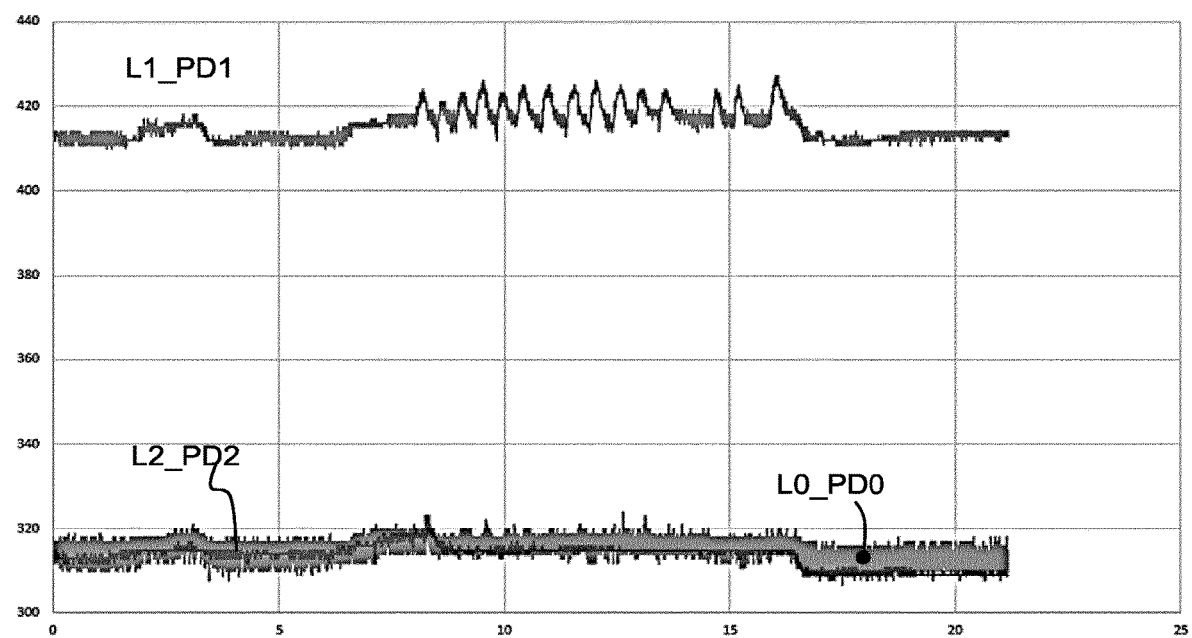
FIG. 13 shows the three reflection signals for the sensor system of FIG. 9.

FIG. 13 shows the three reflection signals L1_PD1, L2_PD2 and L0_PD0. It shows milk passing detector PD1, and the pulses shown may be used to derive a flow volume.

A high pass filter may be used to remove signals resulting from the movement of the nipple within the breast shield during expression.

In all the above examples, pulsed illumination may be used to correct for ambient light variations by taking the difference in intensities measured for ON and OFF situations. In addition, by taking the zero and first order moments of power spectra within a frequency bandwidth, e.g. 0 to 100 kHz, the presence of scattering sites (concentration of dynamic scatters) and flux (approximately concentration x velocity) of dynamic scatters in the milk may be derived. This may then enable filtering out the contribution from ambient light from other static background signals.

The use of cross polarized detection can further enhance the sensitivity to scattered light from the milk compared to reflected background light from other interfaces. Analysis of a speckle pattern using a low cost CMOS sensor can improve the sensitivity of the signal detected from the drops of milk.

In addition, the presence of milk can be detected using Laser speckle contrast analysis (LASCA), also known as laser speckle contrast imaging (LSCI) using a CCD camera with fixed exposure settings and laser illumination over the path through which the milk flows. Speckle contrast is defined as the ratio between the standard deviation of the intensity and the mean of the intensity. When there is no milk flow in the optical path between the laser source and camera or when the illuminated object is static such as milk bottle, the speckle pattern is stationary. When there is movement in the optical path, such as flow of milk, the speckle pattern will change over time, resulting in motion blurring. If there is a lot of movement, blurring will increase, the standard deviation of the intensity will decrease and consequently, the speckle contrast will be lower.

The stimulation setting for example involves applying a first, relatively low level of vacuum (by which is meant a pressure only slightly below ambient pressure) at a first relatively high cycle rate (short cycles).

The expression setting then involves applying a second, relatively high level of vacuum (by which is meant a pressure below ambient pressure by a greater amount) at a second, relatively low cycle rate (long cycles).

Examples of typical pressure and cycle timings for the stimulation setting are −170 mbar (−17 kPa, i.e. 17 kPa below atmospheric pressure) and a cycle of duration of 0.6 s. Typically, the pressure is in the range −10 kPa to −20 kPa with a cycle duration of less than 1.0 s.

Examples of typical pressure and cycle timings for the expression settings are −250 mbar (−25 kPa, i.e. 25 kPa below atmospheric pressure) and a cycle duration of 1.2 s. Typically, the pressure is in the range −22 kPa to −35 kPa with a cycle duration of more than 1 s, for example 1.0 s to 1.5 s.

These are just examples to give an indication of the typical difference between the expression mode and the stimulation mode.

The optical sensing may be based on the use of a near infrared LED and suitable detector (which could be a broadband detector with suitable filtering to be selective to the LED frequency).

The processing of the optical signals may be performed at various possible locations. The processing may built in to the breast pump system, or integrated with the sensor system (when it is for example a clip-on feature) or in a remote device such as a mobile phone, or even hosted remotely in the cloud.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A collection vessel system for use with a breast pump, comprising:
   a collection vessel for collecting milk expressed during use of the breast pump; and
   a sensor system for sensing the start of milk expression into the collection vessel, wherein the collection vessel comprises a base with an annular seat portion and a raised central portion,
   wherein the sensor system is located at the base of the collection vessel and comprises a sensor ring having:
   an optical emitter arrangement;
   an optical detector arrangement; and
   an output for providing a signal indicating the presence of the first milk expressed for use in controlling the breast pump to switch from a stimulation mode to an expression mode,
   wherein an optical path between the optical emitter arrangement and the optical detector is changed by the presence of milk anywhere in the vicinity of the ring such that the sensor system is for sensing milk collected at any location around the annular seat portion.

2. The collection vessel of claim 1, further comprising:
   a blocking arrangement between the optical emitter arrangement and the optical detector arrangement for blocking a direct light path therebetween,
   wherein when the collection vessel is empty, radiation from the optical emitter arrangement reaching the optical detector arrangement is below a threshold and when the collection vessel contains liquid, scattering or reflection of the radiation from the optical emitter arrangement by the liquid results in the radiation from the optical emitter arrangement reaching the optical detector being above the threshold.

3. The collection vessel of claim 2, wherein liquid anywhere in the vicinity of the ring results in the radiation from the optical emitter arrangement reaching the optical detector arrangement exceeding the threshold.

4. The collection vessel of claim 3, wherein the sensor ring comprises an alternating sequence of optical emitters and optical detectors around the ring.

5. The collection vessel of claim 4, wherein the blocking arrangement comprises a blocking element between each adjacent optical emitter and optical detector.

6. The collection vessel of claim 3, wherein the sensor ring comprises an optical emitter, a first ring shaped lightguide for directing the radiation from the optical emitter, an optical detector, and a second ring shaped lightguide for guiding radiation to the optical detector, wherein the blocking arrangement comprises a blocking element between the first and second lightguides.

7. The collection vessel of claim 1, integrated into a holder for a base of the collection vessel.

8. A breast pump device, comprising
   at least one breast receiving portion configured to receive a breast of a user;
   a pressure source coupled to the at least one breast receiving portion and being configured to generate at least an under-pressure;
   a controller configured to control an operation of the pressure source in a stimulation mode and an expression mode; and
   the collection vessel of claim 1, wherein the controller is configured to switch from the stimulation mode to the expression mode in response to a signal from the sensor system of the collection vessel.

* * * * *